US011890634B2

(12) United States Patent
Duffin et al.

(10) Patent No.: US 11,890,634 B2
(45) Date of Patent: Feb. 6, 2024

(54) EDDY CURRENT SPRINKLER DAMPENER

(71) Applicant: XCAD USA, Paul, ID (US)

(72) Inventors: Don Duffin, Paul, ID (US); Casey Nutt, Paul, ID (US)

(73) Assignee: XCAD USA, Paul, ID (US)

(*) Notice: Subject to any disclaimer, the term of this patent is extended or adjusted under 35 U.S.C. 154(b) by 55 days.

(21) Appl. No.: 16/675,079

(22) Filed: Nov. 5, 2019

(65) Prior Publication Data

US 2020/0070187 A1 Mar. 5, 2020

Related U.S. Application Data

(60) Provisional application No. 62/755,974, filed on Nov. 5, 2018.

(51) Int. Cl.

*B05B 3/00* (2006.01)
*B05B 3/04* (2006.01)
*H01F 7/02* (2006.01)

(52) U.S. Cl.

CPC ............ *B05B 3/006* (2013.01); *B05B 3/0486* (2013.01); *H01F 7/02* (2013.01)

(58) Field of Classification Search

CPC .......... B05B 3/006; B05B 3/0486; H01F 7/02
USPC ... 239/222.11, 222.17, 222.21, 223, DIG. 11
See application file for complete search history.

(56) References Cited

U.S. PATENT DOCUMENTS

| | | | | |
|---|---|---|---|---|
| 4,923,120 | A | 5/1990 | Hammelmann | |
| 5,141,158 | A | 8/1992 | Allen | |
| 5,381,960 | A | 1/1995 | Sullivan | |
| 6,864,591 | B2 * | 3/2005 | DeFrank | B05B 3/006 290/1 R |
| 6,932,279 | B2 | 8/2005 | Burcham | |
| 7,287,710 | B1 | 10/2007 | Nelson | |
| 7,562,833 | B2 | 7/2009 | Perkins | |
| 8,556,196 | B2 | 10/2013 | Lawyer | |
| 8,991,724 | B2 | 3/2015 | Sesser | |
| 8,998,109 | B2 * | 4/2015 | Katzman | B05B 3/005 239/252 |
| 9,010,660 | B2 | 4/2015 | Sesser | |
| 9,283,577 | B2 | 3/2016 | Sesser | |
| 9,700,904 | B2 | 7/2017 | Kim | |
| 2011/0031332 | A1 | 2/2011 | Sesser | |
| 2012/0318888 | A1 | 12/2012 | Gandin | |

FOREIGN PATENT DOCUMENTS

| | | | |
|---|---|---|---|
| EP | 2671645 | A1 | 10/2013 |
| WO | WO2007109298 | A3 | 9/2007 |

* cited by examiner

*Primary Examiner* — Christopher S Kim
(74) *Attorney, Agent, or Firm* — Scott Swanson; Shaver & Swanson

(57) ABSTRACT

An improved sprinkler distributor dampener utilizes at least one magnet and an electrically conductive material arranged so as to create an eddie current. The sprinkler is configured with a nozzle that directs fluid at the distributor. The distributor is configured to spin or rotate from the force of the fluid spray and thus distribute fluid in a randomized pattern. The dampener controls the speed of rotation of the distributor, which is preferably a distribution disc.

11 Claims, 6 Drawing Sheets

EDDY CURRENT SPRINKLER DAMPENER

PRIORITY/CROSS-REFERENCE TO RELATED APPLICATIONS

This application claims the benefit of U.S. Provisional Application No. 62/755,974 filed on Nov. 5, 2018, the disclosure of which is incorporated by reference.

TECHNICAL FIELD

The disclosure generally relates to the field of irrigation, in particular to the speed control of sprinkler distributors using an eddy current dampener.

BACKGROUND AND SUMMARY

Sprinkler distributors redirect the flow of fluid (generally water) from the nozzle at an angle such that the fluid spins the distributor which converts some of the fluid's kinetic energy into the distributor's rotational energy. The use of a dampener on a spinning sprinkler distributor increases the sprinkler's whetted diameter by reducing the amount of the fluid's kinetic energy that is used to turn the distributor. Dampeners reduce the amount of rotational energy the distributor takes out of the fluid, allowing the fluid to travel farther increasing the sprinkler's whetted diameter.

What is disclosed herein is a sprinkler dampener that utilizes an eddy current dampener for speed control of the distributor. The use of an eddy current dampener for speed control on a sprinkler is thought to increase the life of the sprinkler by reducing wear and eliminating the need for dampening fluid. An eddy current dampener resists motion without any physical contact which eliminates any wear on the moving faces, and thus will not decrease in performance over time. An eddy current dampener also does not require dampening fluid to function, thus eliminating leaking and sealing problems inherent with traditional dampeners. Not requiring dampening fluid also allows the bearings to be greased with a more suitable fluid, increasing bearing life. These features of an eddy current dampener make it much more durable and thus increase the life of the sprinkler.

DETAILED DESCRIPTION OF THE EXEMPLARY EMBODIMENTS

Figure 1:
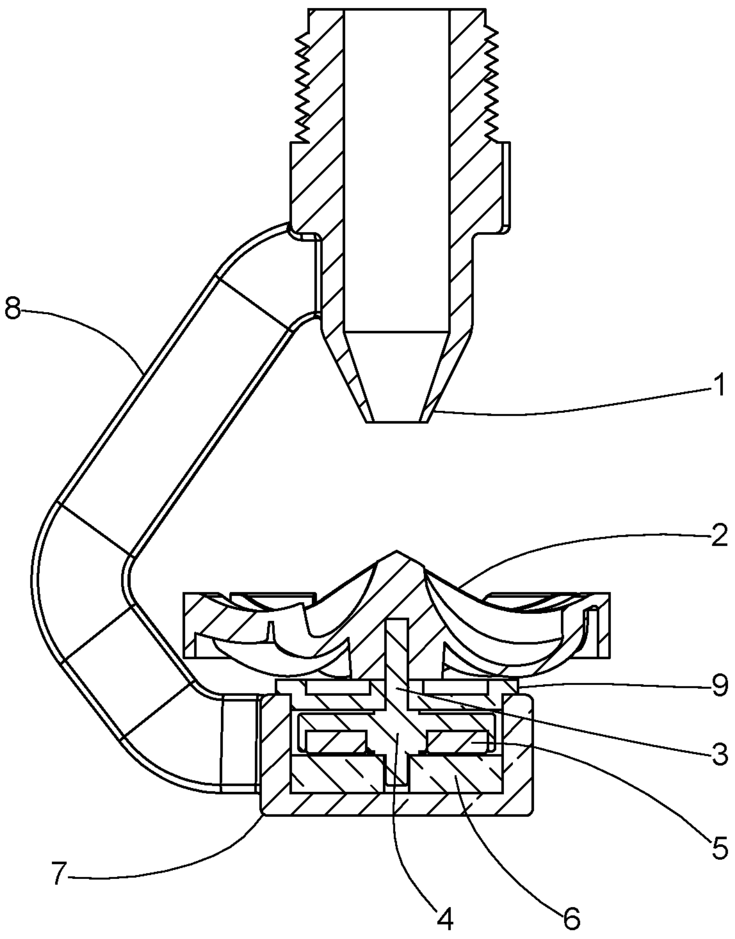
FIG. 1 is a cutaway view of a sprinkler and an embodiment of an eddy current speed control device for controlling the speed of rotation of the sprinkler distributor.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined herein.

In the following description and in the figures, like elements are identified with like reference numerals. The use of "e.g.," "etc," and "or" indicates non-exclusive alternatives without limitation unless otherwise noted. The use of "including" means "including, but not limited to," unless otherwise noted.

Figure 2:
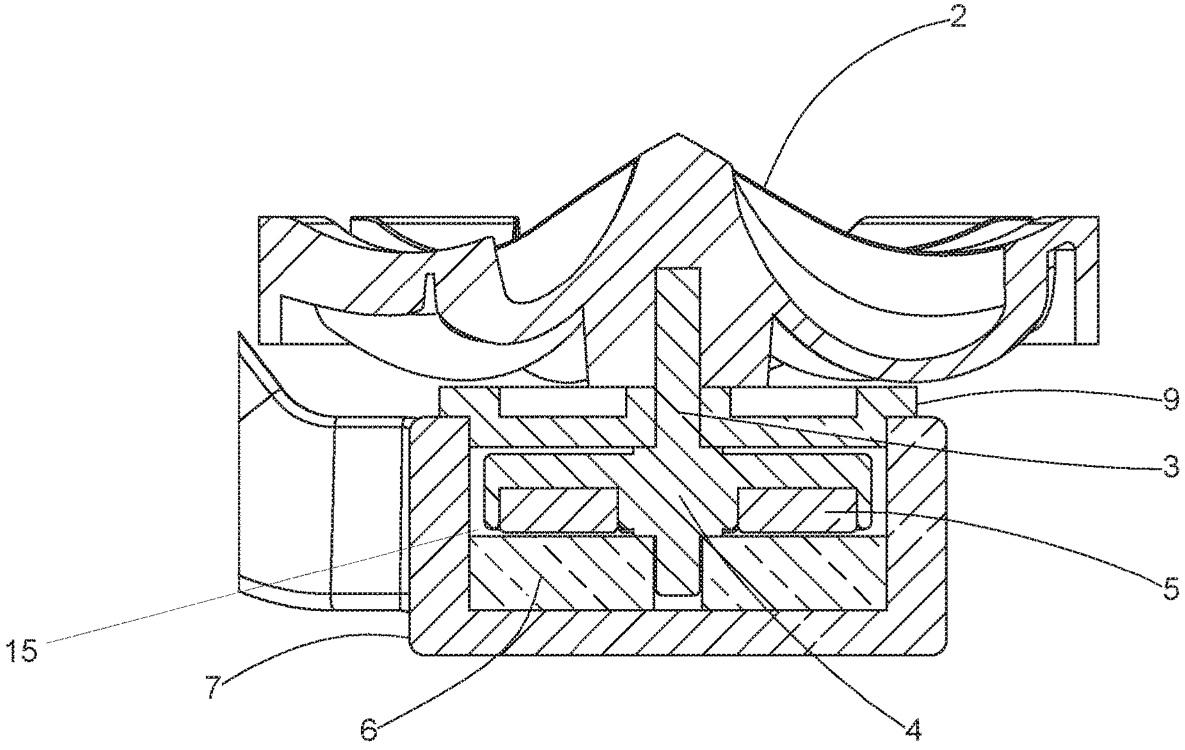
FIG. 2 is a magnified view of the embodiment of sprinkler distributor and an embodiment of an eddy current speed control device for controlling the speed of rotation of the sprinkler dampener as shown in FIG. 1.
Figure 3:
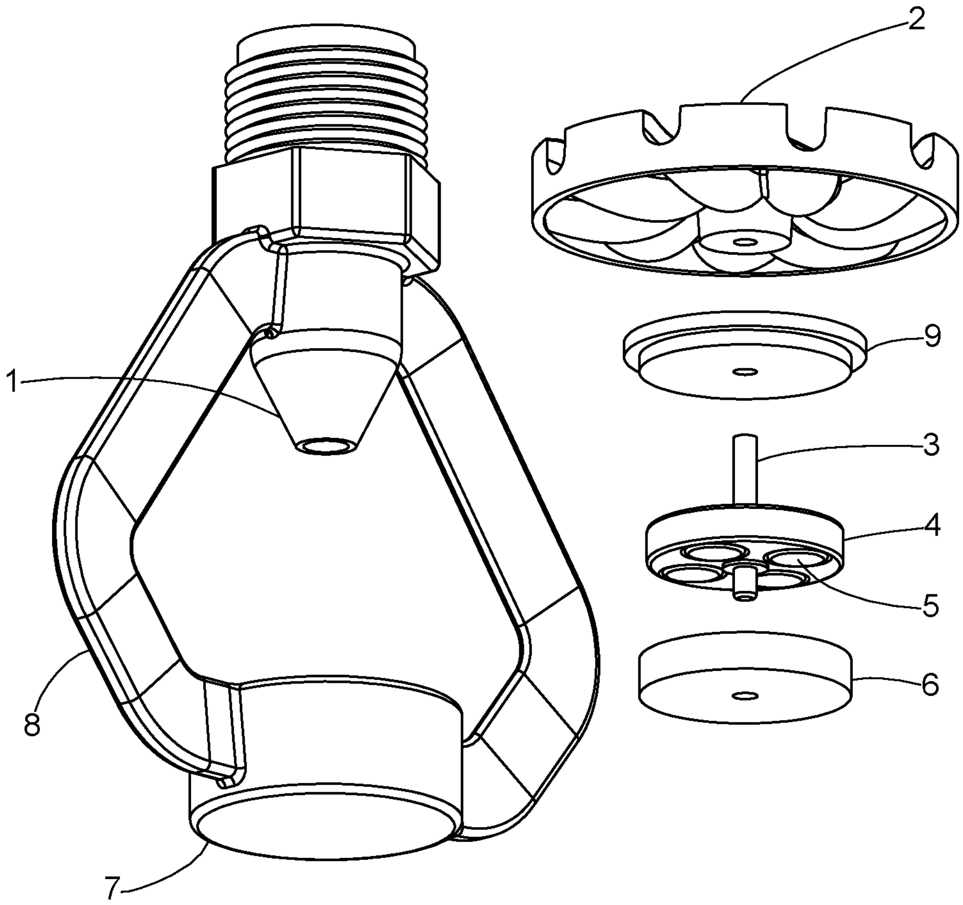
FIG. 3 is a perspective exploded view of an embodiment of a sprinkler having a distributor and an embodiment of an eddy current speed control device.

FIGS. 1 and 2 depict a sprinkler including an eddy current dampener configured to slow or regulate the rotational speed of a distributor through uses of a magnet and an opposing electrically conductive material arranged to generate an eddy current between the magnet and the electrically conductive material. When either of the magnet or the electrically conductive material connected to the sprinkler distributor rotates, the eddy effect between the magnet and the electrically conductive material serves to dampen the rotation of the rotating magnet(s) or electrically conductive material and thus dampens the rotation of the distributor. The sprinkler of FIGS. 1 and 2 includes a nozzle (1) that sprays a stream of fluid that hits a fluid distributor (2). The distributor redirects the fluid to be discharged such that it causes the distributor to spin or rotate. The rotation of the distributor (2) causes the axle (3) to rotate along with the magnets (5). In the depicted embodiment the distributor is a generally disc shaped devices. The distributor is connected to a body (7) that is connected to the main body of the sprinkler by one or more arms (8). The spinning distributor is directly or indirectly connected to one or more magnets (5) causing the magnet(s) to spin past a section of electrically conductive material (6). The electrically conductive material can be arranged in a variety of configurations, including but not limited to a plate, disk, or ring made of electrically conductive material. The electrically conductive material can be configured from one or more electrically conductive materials. In a preferred embodiment the electrically conductive material includes copper.

The rotation of the magnet(s) past the electrically conductive material induces an eddy current which resists motion and slows or regulates the rotation of the distributor. In alternative embodiments, a cap can optionally be utilized to seal the lower portion of the sprinkler containing the eddy dampener assembly from the sprinkler. In the depicted embodiment of FIG. 1, the optional cap (9) is also serving as a bushing to hold the shaft in place. However, as discussed above due to the lubrication free characteristics of the eddy dampener, sealing the lower portion of the sprinkler is not required. Alternatively, the dampener can be configured with multiple layers of magnets and electrically conductive material to increase the dampening effect. This is similarly depicted by the element depicted as (9) in FIG. 1 if constructed at least partially of an electrically conductive material.

Figure 4:
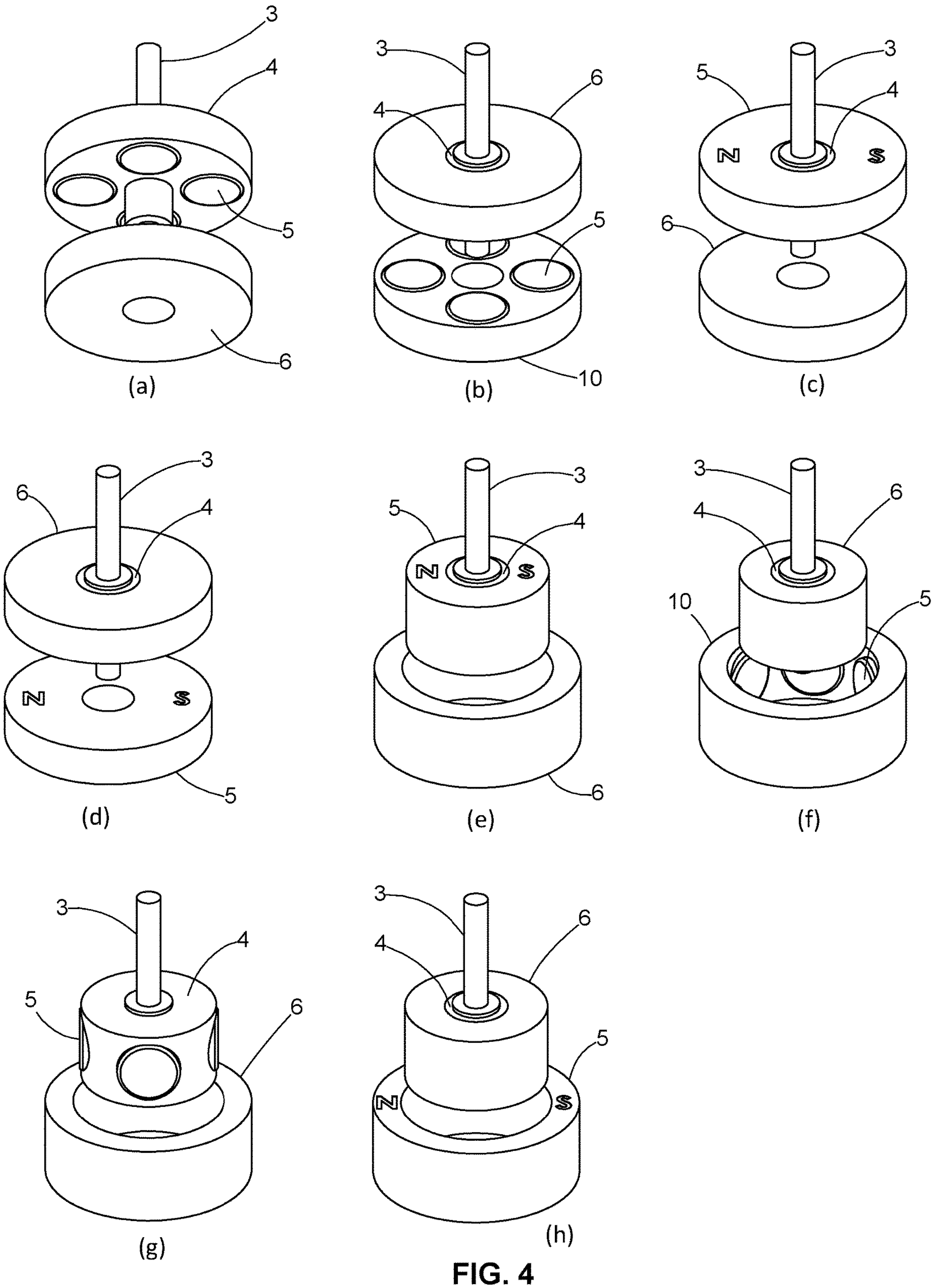
FIG. 4 is a perspective exploded view of a series of embodiments of eddy current speed control devices for use with a sprinkler distributor.

FIG. 4 illustrates a series of alternative embodiments of eddy current sprinkler dampeners that can be utilized with a sprinkler distributor. In some embodiments, the magnet(s) of the eddy dampener are configured to rotate with rotation of the distributor as depicted in embodiments (a), (c), (e), and (g). Alternatively, the electrically conductive element can be configured to rotate with rotation of the distributor as depicted in embodiments (b), (d), (f), and (h). The electrically conductive elements and the magnets can be configured to be in opposing plates or discs, or in a cylindrical or rounded shape with the stationary element circumvolving the rotating element as shown in embodiments (e), (f), (g), and (h). The embodiments shown herein are typically exemplary unless expressly recited in a claim hereto.

Figure 5:
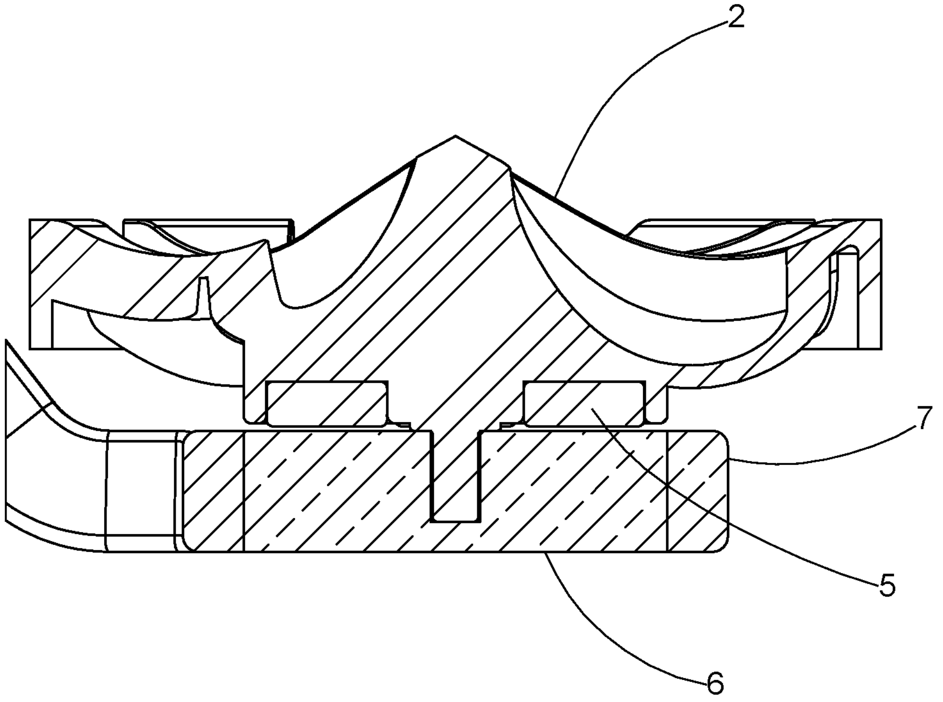
FIG. 5 is a cutaway view of an embodiment of an eddy current sprinkler dampener in which the magnet(s) are integral with a distributor.

FIG. 5 depicts an embodiment in which the magnet(s) or alternatively the electrically conductive material is integral with the distributor. In the depicted embodiment the sprinkler nozzle sprays on the distributor with integral magnet(s) or electrically conductive material causing the distributor with integral magnet(s) or electrically conductive material to rotate. This generates an eddy current causing the rotational distributor speed to slow and/or regulate. Alternatively a bushing can be positioned on the axle to allow for rotation or spinning of the distributor independent of the axle.

Figure 6:
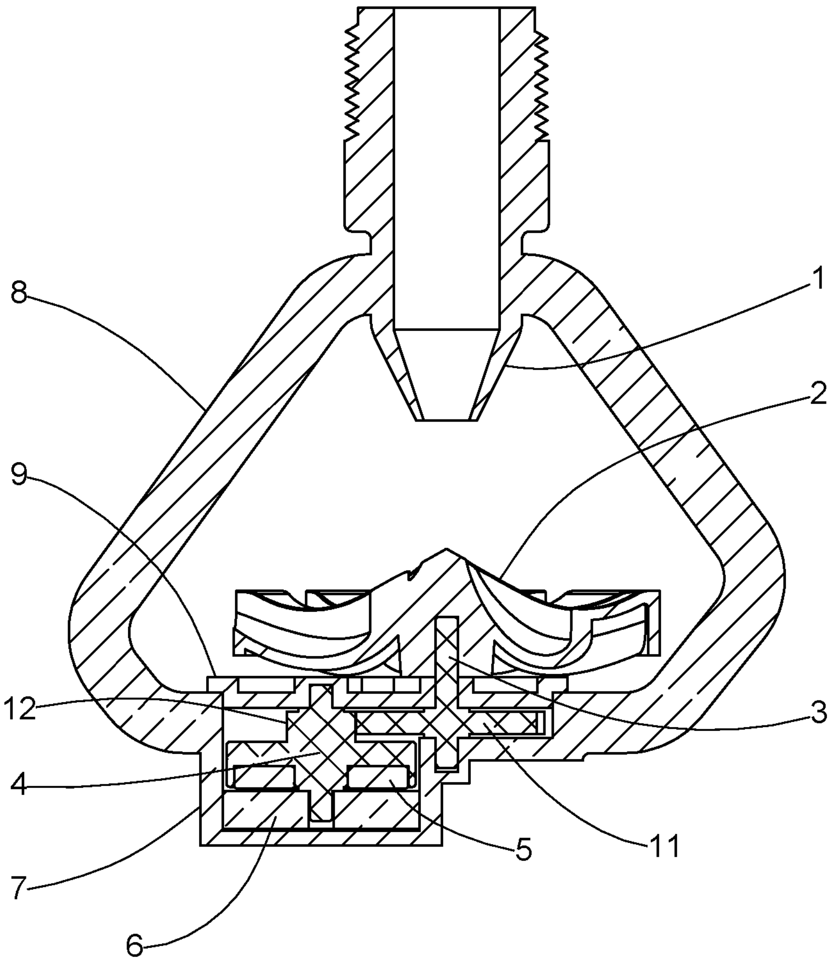
FIG. 6 is a cutaway view of an embodiment of an eddy current sprinkler dampener in which the magnet(s) are indirectly connected to a distributor.

Alternatively, the distributor can be directly or indirectly connected to the conductive material causing the conductive material to spin past the magnets to induce an eddy current. FIG. 6 depicts an embodiment in which the distributor is indirectly connected to the eddy dampener via a distributor gear (11) driven by the distributor and a rotor gear (12) driven by the distributor gear. Fluid spraying on the distributor causes the distributor to rotate, causing the distributor gear (4) to rotate. Rotation of the distributor gear causes the rotor gear to rotate, thus causing the rotation of the magnet(s) material (5) of the eddy dampener to rotate. In an alternative embodiment in which the rotor gear is connected to the electrically conductive material, the rotor gear causes the electrically conductive material to rotate. In an alternative embodiment, multiple dampeners are driven by the distributor gear.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

While certain exemplary embodiments are shown in the Figures and described in this disclosure, it is to be distinctly understood that the presently disclosed inventive concept(s) is not limited thereto but may be variously embodied to practice within the scope of this disclosure. From the foregoing description, it will be apparent that various changes may be made without departing from the spirit and scope of the disclosure as defined herein.

What is claimed is:

1. A sprinkler having a nozzle and a distributor, wherein said distributor is configured to distribute fluid sprayed from said nozzle and to rotate from fluid impinging on said distributor, wherein said sprinkler comprises an eddy current dampener configured to slow the speed of rotation of said distributor, wherein said eddy current dampener comprises at least one magnet and an electrically conductive material, wherein one of said at least one magnet or said electrically conductive material is connected to said distributor so as to rotate when said distributor rotates, wherein said eddy current dampener is configured such that rotation of one of said magnet and said electrically conductive material induces an eddy current between said magnet and said electrically conductive material when said distributor rotates thus dampening the rotation of the distributor.

2. The sprinkler of claim 1, wherein said at least one magnet comprises a plurality of magnets.

3. The sprinkler of claim 1, wherein said at least one magnet is connected to said distributor such that said magnet is configured to rotate when said distributor rotates.

4. The sprinkler of claim 3, wherein said electrically conductive material is configured in a shape selected from the group consisting of a plate, a disk, and a ring.

5. The sprinkler of claim 3, wherein said magnet is integral to said distributor.

6. The sprinkler of claim 1, wherein said electrically conductive material is connected to said distributor such that said electrically conductive material is configured to rotate when said distributor rotates.

7. The sprinkler of claim 1, wherein said at least one magnet is indirectly connected to said distributor.

8. The sprinkler of claim 1, wherein said electrically conductive material comprises copper.

9. The sprinkler of claim 1, wherein said at least one magnet is connected to said distributor and configured to rotate when said distributor rotates.

10. The sprinkler of claim 1, wherein said at least one magnet or said electrically conductive material connected to said distributor and configured to rotate are connected to an axle connected to said distributor, wherein said axle is configured to rotate when said distributor rotates.

11. The sprinkler of claim 1, wherein said at least one magnet is integral with said distributor.

* * * * *